United States Patent
Bengtsson et al.

(10) Patent No.: US 9,767,949 B2
(45) Date of Patent: Sep. 19, 2017

(54) CONTROLLING OF A MAGNETIC CONNECTION BETWEEN AN ELECTRICAL DEVICE AND A CABLE

(71) Applicant: Sony Mobile Communications Inc., Tokyo (JP)

(72) Inventors: Erik Bengtsson, Eslov (SE); Ola Thorn, Limhamn (SE); Kare Agardh, Rydeback (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 147 days.

(21) Appl. No.: 14/739,913

(22) Filed: Jun. 15, 2015

(65) Prior Publication Data

US 2016/0365185 A1 Dec. 15, 2016

(51) Int. Cl.
| H01H 47/00 | (2006.01) |
| H01F 7/06 | (2006.01) |
| H02N 15/00 | (2006.01) |
| H01F 38/14 | (2006.01) |
| H01R 13/62 | (2006.01) |
| G06F 1/16 | (2006.01) |

(52) U.S. Cl.
CPC ........... *H01F 7/064* (2013.01); *G06F 1/1633* (2013.01); *H01F 38/14* (2013.01); *H01R 13/6205* (2013.01); *H02N 15/00* (2013.01); *G06F 1/1677* (2013.01); *H01F 2038/143* (2013.01); *H01R 2201/16* (2013.01)

(58) Field of Classification Search
USPC ........................................ 361/139, 144, 160
See application file for complete search history.

(56) References Cited

U.S. PATENT DOCUMENTS

| 5,812,356 | A | 9/1998 | O'Connor |
| 9,153,983 | B2 * | 10/2015 | Sakai .................... H02J 7/0042 |
| 2007/0072442 | A1 | 3/2007 | DiFonzo et al. |
| 2007/0250981 | A1 | 11/2007 | Seibert |
| 2008/0164934 | A1 | 7/2008 | Hankey et al. |
| 2010/0233889 | A1 | 9/2010 | Kiani |

(Continued)

FOREIGN PATENT DOCUMENTS

| WO | 2008058562 A | 5/2008 |
| WO | 2013075847 A | 5/2013 |
| WO | 2014198324 A | 12/2014 |

OTHER PUBLICATIONS

International Searh Report and Written Opinion from corresponding International Application No. PCT/IB2015/059613, dated May 3, 2016.

*Primary Examiner* — Danny Nguyen
(74) *Attorney, Agent, or Firm* — Tucker Ellis LLP

(57) ABSTRACT

The present invention relates to an electrical device comprising: a first connector (102) being magnetically connectable to a second connector (202) of an accessory (200) for forming a magnetic connection between the first and second connectors, wherein at least one of the first and second connectors comprises an electromagnet; a sensor (120) comprising at least one of a motion sensor, a proximity sensor and a microphone, wherein the sensor is arranged to output a sensor signal (121); and a electromagnetic controller (108) connected to the electromagnet and arranged to control the magnetic field of the electromagnet based on the sensor signal.

9 Claims, 1 Drawing Sheet

(56) References Cited

U.S. PATENT DOCUMENTS

| | | |
|---|---|---|
| 2011/0181238 A1 | 7/2011 | Soar |
| 2012/0021619 A1 | 1/2012 | Bilbrey |
| 2013/0094680 A1 | 4/2013 | Allen |
| 2014/0204021 A1 | 7/2014 | Sugihara et al. |
| 2016/0020557 A1* | 1/2016 | Daoura .............. H01R 13/6205 439/38 |
| 2016/0266214 A1* | 9/2016 | Nomura ................ G01R 33/02 |
| 2016/0284497 A1* | 9/2016 | Stryker ................ H01H 50/16 |

* cited by examiner

CONTROLLING OF A MAGNETIC CONNECTION BETWEEN AN ELECTRICAL DEVICE AND A CABLE

TECHNICAL FIELD

The present invention relates to a magnetic connection between an electrical device and an accessory. The accessory may e.g. a cable.

BACKGROUND

In modern electrical devices an important feature is to connect the electrical device to any kind of accessory for transferring data to and/or from the electrical device and/or charging a battery of the electrical device.

Typically when connecting an accessory to the electrical device a first connector of the accessory is paired with a second connector of the electrical device such that a galvanic connection between the accessory and the electrical device is established. Data may thereafter be transferred to and/or from the electrical device via the connection. Alternatively, or in combination the battery of the electrical device may be charged via the connection. In case of charging the charging current is transferred via pogo pins of the first and second connectors. Typically the first and second connectors have corresponding contact surfaces. The contact surfaces are configured to ensure that the first connector stays connected to the second connector while e.g. charging the battery. Another way to ensure that the first connector stays connected to the second connector is to utilize some mechanical means such as a spring or a hook to keep the connectors together. Further, another way to ensure that the first connector stays connected to second connector is to utilize a magnetic force. A magnet at the first connector and a magnet at the second connector may be used for establishing a magnetic connection between the electrical device and the accessory. Alternatively, one of the magnets may be replaced by any kind of magnetic material, e.g. a metal plate. Hence, the accessory is magnetically connected to the electronic device.

Non-limiting examples of an accessory are a cable, an external battery and an additional device arranged to be connected to the electrical device. Non-limiting examples of an additional device are a loudspeaker, a microphone, a modem and a camera.

A common drawback for both magnetic and mechanical systems is that the force used for securing the connection must be overcome by the user when disconnecting the accessory from the electrical device. Thus, there is a design tradeoff between a good secure connection when the accessory is attached, and an easy way for the user to release the accessory with minimum force.

SUMMARY OF THE INVENTION

In view of the above, it is an object of the present invention to provide an improved controlling of a magnetic connection between an electrical device and an accessory.

According to a first aspect a method for controlling a magnetic connection between a first connector of an electrical device and a second connector of an accessory arranged to be connected to the electrical device, wherein at least one of the first and second connectors comprises an electromagnet, is provided. The method comprises: receiving a sensor signal from at least one of a motion sensor, a proximity sensor and a microphone of the electrical device, and controlling the magnetic field of the electromagnetic connector based on the sensor signal.

It shall be noticed that the first and second connectors are not limited to connectors for establishing a galvanic connection between the cable and the electrical device. The first and second connectors may for example also be utilized in combination with couplers for short range wireless technologies.

By controlling the magnetic field the electromagnetic connector based on the sensor signal disconnection of a cable connected to the electrical device may be facilitated. At the same time a secure connection between the accessory and the electrical device is also achieved. Moreover, power consumption of the electromagnet may be reduced. The magnetic field of the electromagnet may e.g. be reduced once the magnetic contact has been established and the electrical device is not moving. Furthermore, by the above magnetic connection ejection and/or attraction boost may be implemented.

The controlling may comprise weakening the magnetic field of the electromagnet.

The controlling may comprise strengthening the magnetic field of the electromagnet.

The controlling may comprise controlling the magnetic field of the electromagnet such that the magnetic connection between the electrical device and the accessory is released.

The accessory may be a cable used to connect the electrical device to a power source for charging a battery of the electrical device, wherein the method further may comprise checking a battery level of the battery, and wherein when the battery level is below a predetermined threshold the controlling does not comprise weakening the magnetic field of the electromagnet.

When the sensor signal corresponds to a falling movement of the electrical device, the controlling may comprise strengthening the magnetic field of the electromagnetic connector.

When the sensor signal corresponds to a lifting movement of the electrical device, the controlling may comprise weakening the magnetic field of the electromagnetic connector.

When the sensor signal corresponds to a user holing the electrical device, the controlling may comprise weakening the magnetic field of the electromagnetic connector.

According to a second aspect a non-transitory computer-readable recording medium is provided. The non-transitory computer-readable recording medium having recorded thereon software code portions for implementing the method according to the above when executed on a device having processing capabilities.

The above mentioned features of the method, when applicable, apply to this second aspect as well. In order to avoid undue repetition, reference is made to the above.

According to a third aspect an electrical device is provided. The electrical device comprises: a first connector being magnetically connectable to a second connector of an accessory for forming a magnetic connection between the first and second connectors, wherein at least one of the first and second connectors comprises an electromagnet; a sensor comprising at least one of a motion sensor, a proximity sensor and a microphone, wherein the sensor is arranged to output a sensor signal; and a electromagnetic controller connected to the electromagnet and arranged to control the magnetic field of the electromagnet based on the sensor signal.

The motion sensor may comprise at least one of an accelerometer, gyroscope and a magnetometer. Alternatively or in combination, the motion sensor may comprise a relative positioning function utilizing wireless technologies such as Bluetooth or WLAN for determining motion of the electrical device.

The proximity sensor comprises at least one of, an Infrared, IR, sensor, a capacitive and/or resistive sensor and an ultrasonic sensor. Alternatively or in combination, the proximity sensor may comprise a ranging function utilizing wireless technologies such as Bluetooth and WLAN for determining range between different objects.

Alternatively or in combination, the proximity sensor may comprise a Body Area Network, BAN, transceiver used in BAN-network utilizing body transferred signals being capacitively coupled to the body to and/or from the transceiver. The electrical device may further comprise a battery and a battery level sensor arranged to check a battery level of the battery and to output a battery level signal to the electromagnetic controller.

The electromagnetic controller may be arranged to, when the battery level is below a predetermined threshold, not weakening the magnetic field of the electromagnetic connector.

The above mentioned features of the method, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
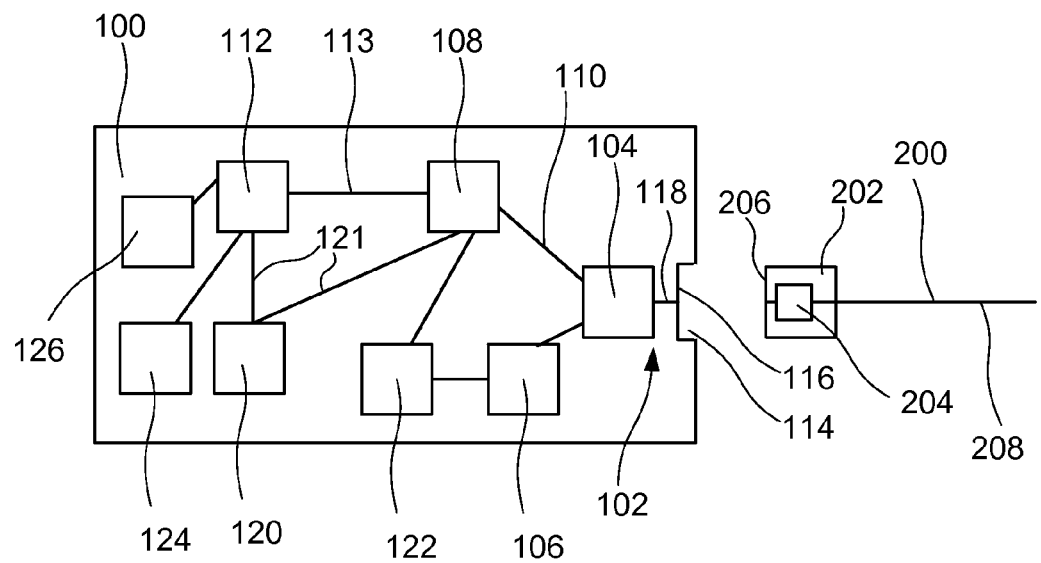
FIG. 1 is a schematic block diagram of an electrical device and an accessory in the form of a cable.

FIG. 1 illustrates an electrical device 100 having a first connector 102 connectable to a second connector 202 of an accessory 200. In the following description the accessory 200 is a cable. However, the accessory 200 may be implemented in many different ways know to a person skilled in the art. Non-limiting examples of an accessory are a cable, an external battery and an additional device arranged to be connected to the electrical device. Non-limiting examples of an additional device are a loudspeaker, a microphone, a modem and a camera. The additional device may also be another electrical device just as the electrical device. Hence, in case the electrical device is a mobile phone, the additional device may also be a mobile phone.

The first connector 102 of the electrical device 100 comprises an electromagnet 104 adapted to generate a magnetic field when supplied with electrical power. The electromagnet 104 may be supplied with electrical power from a battery 106 or any other kind of power source.

The electromagnet 104 is further connected to an electromagnet controller 108 in the electrical device 100. The electromagnet controller 108 is adapted to control the power supply to the electromagnet 104 via an electromagnet control signal 110. The electromagnet controller 108 is arranged to control the magnetic field generated by the electromagnet 104 by altering the electromagnet control signal 110. The magnetic field may be increased or decreased.

The second connector 202 of the accessory 200 comprises a magnet 204. The magnet 204 may be an electromagnet, a permanent magnet or any kind of magnetic material, e.g. a metal plate.

The second connector 202 is arranged to be connectable to the electrical device 100 at the first connector 102 of the same. The portion of the electrical device 100 where the second connector 202 is arranged to be connected to the electrical device 100 is called a socket 114. The socket 114 may be a flat surface or any other mechanical coupling according to prior art. Hence, the first connector 102 of the electrical device 100 comprises a socket 114. The socket 114 has a contact surface 116 at which the second connector 202 of the accessory 200 is connectable to the electrical device 100. The second connector 202 of the accessory 200 has a contact surface 206 where the second connector 202 may connect to the contact surface 116 of the socket 114 of the electrical device 100. The second connector 202 of the accessory 200 also comprises a wire 208 adapted to connect to a corresponding wire 118 of the electrical device 100 at the socket 114. For simplicity only one wire of the accessory 200 being arranged connect to a corresponding wire of the electrical device 100 is shown, however, it shall be understood that there may be connection between a plurality of wires at the connection between the accessory 200 and the electrical device 100.

When supplied with electrical power, the electromagnet 104 is magnetically connectable to the magnet 204 of the second connector 202. Hence, the electromagnet 104 of the electrical device 100 is capable of magnetically connect to the magnet 204 of the accessory 200, and keep the second connector 202 of the accessory 200 connected to the first connector 102 of the electrical device 100 when supplied with electrical power.

The accessory 200, in the form of a cable, arranged to be connected to the electrical device 100, may be any kind of cable. Non-limiting examples of cables are: a cable of a charger for charging the battery 106 of the electrical device 100, a signal cable such as a High-Definition Multimedia Interface (HDMI) or Universal Serial Bus (USB) cable, and a cable to an external speaker or headphones. It should be understood that by the term "connector" is meant an end part of the cable, which end part comprises the contact surface that is configured to be brought in contact with a contact surface of the electrical device 100.

The electromagnet controller 108 is connected to or is a part of a device controller 112 of the electrical device 100. The device controller 112 may be any kind of Central Processing Unit (CPU) or any other logic within the electrical device 100. The device controller 112 is adapted to control the electrical device 100.

The electrical device 100 further comprises a sensor 120. The sensor 120 comprises at least one of a motion sensor, a proximity sensor and a microphone.

According to non-limiting examples the motion sensor may comprise an accelerometer, a gyroscope and/or a magnetometer. Alternatively or in combination, the motion sensor may comprise a relative positioning function utilizing wireless technologies such as Bluetooth or WLAN for determining motion of the electrical device. The motion sensor is arranged to sense movement of the electrical device 100. The motion sensor may be arranged to sense a falling movement of the electrical device 100. Additionally or in combination the motion sensor may be arranged to sense a lifting movement of the electrical device 100.

According to non-limiting examples the proximity sensor may comprise an Infrared, IR, sensor, a capacitive and/or resistive sensor or an ultrasonic sensor. Alternatively or in combination, the proximity sensor may comprise a ranging function utilizing wireless technologies such as Bluetooth and WLAN for determining range between different objects.

Alternatively or in combination, the proximity sensor may comprise a Body Area Network, BAN, transceiver used in BAN-network utilizing body transferred signals being capacitively coupled to the body to and/or from the transceiver. The proximity sensor is arranged to sense a user holing the electrical device 100.

The microphone is arranged to sense sounds generated in the vicinity of the electrical device. A non-limiting example of such a sound a user telling the electrical device 100 to release or eject a cable connected to the electrical device.

The sensor 120 is arranged to register events. The sensor 120 is arranged to register events using at least one of the motion sensor, the proximity sensor and the microphone. According to the above, the event may be an event generated internally in the electrical device or by input from the user of the electrical device. The sensor 120 is in response to a registered event arranged to output a sensor signal 121. The sensor 120 is arranged to send the sensor signal 121 to the electromagnet controller 108 and/or the device controller 112.

The electromagnet controller 108 and/or the device controller 112 is arranged to send an electromagnet control signal 110 to the electromagnet 104 for controlling the electromagnet 104. The electromagnet control signal 110 is based on the sensor signal 121. Hence, the electromagnet 104 may be controlled based on the registered event. Information about the event may be sent to the electromagnet controller 108 with the device control signal 113. Accordingly, the electromagnet controller 108 is adapted to control the power supply to the electromagnet 104 in dependence of a registered event.

The electromagnet controller 108 may be adapted to control the power supply to the electromagnet 104 such that the magnetic field of the electromagnet is weakened. Hence, the electromagnet controller 108 may be adapted to control the power supply to the electromagnet 104 such that the magnetic connection between an electrical device 100 and the accessory 200 is weakened. Additionally or in combination, the electromagnet controller 108 may be adapted to control the power supply to the electromagnet 104 such that the magnetic connection between an electrical device 100 and the accessory 200 is released. Non-limiting examples of registered events wherein the electromagnet controller 108 may be adapted to control the power supply to the electromagnet 104 such that the magnetic field of the electromagnet is weakened are when the sensor signal corresponds to a lifting movement of the electrical device and/or when the sensor signal corresponds to a user holing the electrical device.

The electromagnet controller 108 may be adapted to control the power supply to the electromagnet 104 such that the magnetic field of the electromagnet is strengthened. Hence, the electromagnet controller 108 may be adapted to control the power supply to the electromagnet 104 such that the magnetic connection between an electrical device 100 and the accessory 200 is strengthened. A non-limiting example of a registered event wherein the electromagnet controller 108 may be adapted to control the power supply to the electromagnet 104 such that the magnetic field of the electromagnet strengthened is when the sensor signal corresponds to a falling movement of the electrical device.

The electrical device 100 may further comprise a battery level sensor 122 arranged to check a battery level of the battery 106. The battery level sensor 122 is also arranged to output a battery level signal to the electromagnetic controller 108 and/or the device controller 112.

According to one embodiment the electromagnetic controller 108 is arranged to, when the battery level is below a predetermined threshold, not weakening the magnetic field of the electromagnetic connector. This may be exemplified by the following non-limiting example. Accordant to this non-limiting example the accessory 200 in the form of a cable is a charging cable used to connect the electrical device 100 to a power source for charging the battery 106 of the electrical device 100. The battery level sensor 122 is arranged to check the battery level of the battery 106. When the battery level is below a predetermined threshold the electromagnetic controller 108 is arranged not to weaken the magnetic field of the electromagnet 104.

Figure 2:
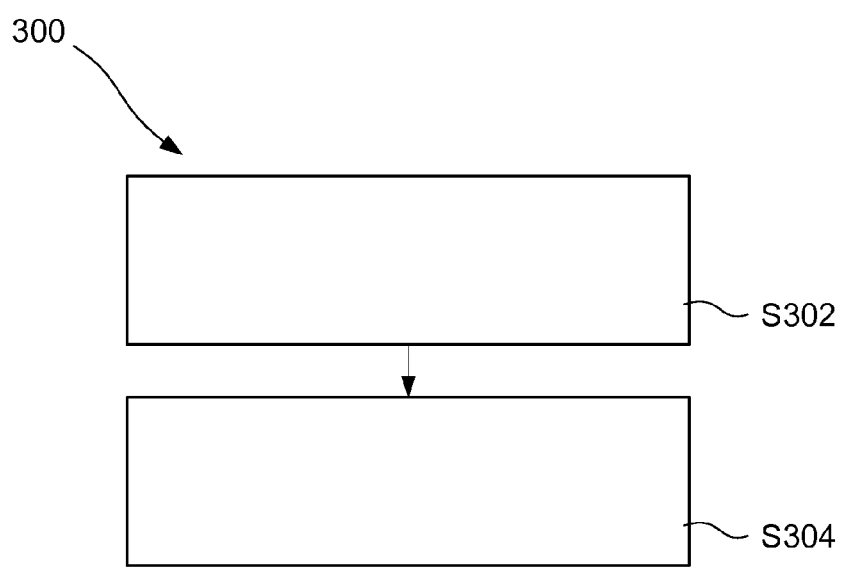
FIG. 2 is a block diagram of a method for controlling a magnetic connection between a first connector of an electrical device and a second connector of an accessory arranged to be connected to the electrical device.

FIG. 2 illustrates a method 300 for controlling a magnetic connection between a first connector of an electrical device and a second connector of a cable arranged to be connected to the electrical device. The method 300 may be performed in the electrical device. The method comprises the following actions, which actions may be carried out in another suitable order than described below.

Receiving S302 a sensor signal from at least one of a motion sensor, a proximity sensor and a microphone of the electrical device.

Controlling S304 the magnetic field of the electromagnetic connector based on the sensor signal. The controlling may comprise weakening the magnetic field of the electromagnet. For example, the controlling may comprise controlling the magnetic field of the electromagnet such that the magnetic connection between the electrical device and the cable is released. Alternatively, the controlling may comprise strengthening the magnetic field of the electromagnet.

The above method may be exemplified by the below non-limiting examples.

In the following examples the electrical device 100 is a mobile phone, smart phone, tablet, a wearable such as a smart watch or wristlet, or the like, having the ability to receive an incoming call. Moreover the accessory 200 is magnetically connected to the electrical device 100 in accordance with what is described above.

According to one embodiment, the electrical device 100 receives the incoming call and signals this to the user by a sound signal and/or a tactile movement using a loudspeaker 124 and/or a vibrator 126. When the user moves the electrical device 100, the magnetic connection is weakened by controlling the electromagnet 104. The user moving the electronic device 100 is registered as an event by the sensor 120 of the electrical device 100. The movement induced by the user may be registered by means of the motion sensor and/or the proximity sensor of the sensor 120. The movement may e.g. be registered as a lifting movement of the electrical device 100. That the user is interacting with the electrical device 100 may be registered by the proximity sensor. According to another embodiment the accessory 200 may be ejected from the electrical device 100 by controlling the electromagnet 104 when the user moves the electrical device 100.

According to another embodiment the battery level sensor 122 is arranged to check the battery level of the battery 106 in the electrical device 100 before a decision to weakening the magnetic field of the electromagnet 104 is taken. Hence, when the battery level of the battery 106 in the electrical device 100 is below a predetermined value/threshold the electromagnet controller 108 and/or the device controller 112 is arranged not to weakening the magnetic field of the electromagnet 104.

It is to be understood that the above examples is not only valid in case of the electrical device is receiving an incoming call. Another example of an events occurring may e.g. be that an alarm of the electrical device is set to start. Yet another event occurring may e.g. be that the user is moving the device.

On the other hand, in case the sensor 120 of the electrical device registers an event in the form of that the electrical device 100 is falling the electromagnet controller 108 and/or the device controller 112 may be arranged to strengthen the magnetic field of the electromagnet 104.

According to other embodiment the weakening and/or strengthening of the magnetic field of the electromagnet 104 may be decided on as a result of an event registered by the microphone of the sensor 120. The user might e.g. tell the electrical device to eject the accessory 200.

A non-transitory computer-readable recording medium is also provided. The non-transitory computer-readable recording medium may have recorded thereon software code portions for implementing one or more of the actions described above. Additionally or in combination the non-transitory computer-readable recording medium may have recorded thereon software code portions for implementing one or more of the features relating to the electrical device 100.

The person skilled in the art realizes that the present invention by no means is limited to the preferred embodiments described above. On the contrary, many modifications and variations are possible within the scope of the appended claims.

For example, according to some aspect of embodiments herein, the object is achieved by an electrical device comprising a first connector which is able to connect to a second connector of a cable. The second connector comprises an electromagnet. The electrical device comprises a magnet that is able to connect magnetically to the electromagnet of the second connector. The electrical device further comprises an electromagnet controller which when connected to the electromagnet of the second connector is able to control power supply of the electromagnet in dependence of a registered event.

Moreover, the magnetic connection between the first connector 102 of the electrical device 100 and the second connector 202 of the accessory 200 may be used in combination with couplers for short range wireless technologies. Such an embodiment may simplify waterproof integration.

Furthermore, the magnetic connection between the first connector 102 of the electrical device 100 and the second connector 202 of the accessory 200 may also be used in combination with optical connection between the electrical device and the accessory.

Moreover, the electrical device 100 may further comprise a permanent magnet adapted to give a guiding force to a user when connecting the second connector 202 of the accessory 200 to the electrical device 100. The permanent magnet should preferably be small enough to not introduce any interference in the electrical device or its surroundings.

Additionally, variations to the disclosed embodiments can be understood and effected by the skilled person in practicing the claimed invention, from a study of the drawings, the disclosure, and the appended claims.

The invention claimed is:

1. A method for controlling a magnetic connection between a first connector of an electrical device and a second connector of a cable used to connect the electrical device to a power source for charging a battery of the electrical device, wherein at least one of the first and second connectors comprises an electromagnet, the method comprising:
   checking a battery level of the battery;
   receiving a sensor signal from at least one of a motion sensor, a proximity sensor and a microphone of the electrical device; and
   controlling the magnetic field of the electromagnetic connector based on the sensor signal;
   wherein when the battery level is below a predetermined threshold the controlling does not comprise weakening the magnetic field of the electromagnet.

2. A method for controlling a magnetic connection between a first connector of an electrical device and a second connector of an accessory arranged to be connected to the electrical device, wherein at least one of the first and second connectors comprises an electromagnet, the method comprising:
   receiving a sensor signal from at least one of a motion sensor, a proximity sensor and a microphone of the electrical device; and
   controlling the magnetic field of the electromagnetic connector based on the sensor signal,
   wherein, at least one of:
      when the sensor signal corresponds to a falling movement of the electrical device, the controlling comprises strengthening the magnetic field of the electromagnetic connector, or when the sensor signal corresponds to a lifting movement of the electrical device, the controlling comprises weakening the magnetic field of the electromagnetic connector, or when the sensor signal corresponds to a user holding the electrical device, the controlling comprises weakening the magnetic field of the electromagnetic connector.

3. An electrical device comprising:
a first connector being magnetically connectable to a second connector of an accessory for forming a magnetic connection between the first and second connectors, wherein at least one of the first and second connectors comprises an electromagnet;
a sensor comprising at least one of a motion sensor, a proximity sensor and a microphone, wherein the sensor is arranged to output a sensor signal; and
an electromagnetic controller connected to the electromagnet and arranged to control the magnetic field of the electromagnet based on the sensor signal;
a battery; and
a battery level sensor arranged to check a battery level of the battery and to output a battery level signal to the electromagnetic controller.

4. The electrical device according to claim 3, wherein the electromagnetic controller is arranged to, when the battery level is below a predetermined threshold, not weakening the magnetic field of the electromagnetic connector.

5. A non-transitory computer-readable recording medium having recorded thereon software code portions for implementing a method when executed on a device having processing capabilities, the computer-readable recording medium including:
instructions to control a magnetic connection between a first connector of an electrical device and a second connector of a cable used to connect the electrical device to a power source for charging a battery of the electrical device, wherein at least one of the first and second connectors comprises an electromagnet;
instructions to check a battery level of the battery;
instructions to receive a sensor signal from at least one of a motion sensor, a proximity sensor and a microphone of the electrical device; and
instructions to control the magnetic field of the electromagnetic connector based on the sensor signal, wherein when the battery level is below a predetermined threshold the instructions to control the magnetic field are to not weaken the magnetic field of the electromagnet.

6. A non-transitory computer-readable recording medium having recorded thereon software code portions for implementing a method when executed on a device having processing capabilities, the computer-readable recording medium including:
instructions to control a magnetic connection between a first connector of an electrical device and a second connector of an accessory arranged to be connected to the electrical device, wherein at least one of the first and second connectors comprises an electromagnet;
instructions to receive a sensor signal from at least one of a motion sensor, a proximity sensor and a microphone of the electrical device; and
instructions to control the magnetic field of the electromagnetic connector based on the sensor signal,
wherein, at least one of:
when the sensor signal corresponds to a falling movement of the electrical device, the instructions to control the magnetic field are to strengthen the magnetic field of the electromagnetic connector, or
when the sensor signal corresponds to a lifting movement of the electrical device, the instructions to control the magnetic field are to weaken the magnetic field of the electromagnetic connector, or
when the sensor signal corresponds to a user holding the electrical device, the instructions to control are to weaken the magnetic field of the electromagnetic connector.

7. An electrical device comprising:
a first connector being magnetically connectable to a second connector of an accessory for forming a magnetic connection between the first and second connectors, wherein at least one of the first and second connectors comprises an electromagnet;
a battery;
a battery level sensor arranged to check a battery level of the battery and to output a battery level signal to the electromagnetic controller; and
an electromagnetic controller connected to the electromagnet and arranged to control the magnetic field of the electromagnet based on the battery level signal.

8. The electrical device according to claim 7, wherein the electromagnetic controller is arranged to, when the battery level is below a predetermined threshold, not weaken the magnetic field of the electromagnetic connector.

9. A method for controlling a magnetic connection between a first connector of an electrical device and a second connector of a cable used to connect the electrical device to a power source for charging a battery of the electrical device, wherein at least one of the first and second connectors comprises an electromagnet, the method comprising:
checking a battery level of the battery; and
controlling the magnetic field of the electromagnetic connector based on the battery level, wherein when the battery level is below a predetermined threshold the controlling does not comprise weakening the magnetic field of the electromagnet.

* * * * *